United States Patent
Satoh

(10) Patent No.: US 7,036,760 B2
(45) Date of Patent: May 2, 2006

(54) TAPE CARTRIDGE

(75) Inventor: Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 189 days.

(21) Appl. No.: 10/810,274

(22) Filed: Mar. 26, 2004

(65) Prior Publication Data

US 2004/0195418 A1    Oct. 7, 2004

(30) Foreign Application Priority Data

Mar. 27, 2003 (JP) ............................ 2003-086945

(51) Int. Cl.
*G11B 23/107* (2006.01)
(52) U.S. Cl. .................................. 242/348.2; 360/132
(58) Field of Classification Search ............. 242/348.2; 360/132
See application file for complete search history.

(56) References Cited

U.S. PATENT DOCUMENTS 6,598,820 B1 *  7/2003  Morita .................... 242/348.2

FOREIGN PATENT DOCUMENTS

JP    11-185435 A1    7/1999

OTHER PUBLICATIONS

Patent Abstracts of Japan for JP11-185435 published on Jul. 9, 1999.

* cited by examiner

*Primary Examiner*—John Q. Nguyen
(74) *Attorney, Agent, or Firm*—Darby & Darby

(57) ABSTRACT

A tape cartridge enabling a leader member fixing a leading edge of a tape-shaped recording medium led outside to acquire sufficient clamping force acting on the leading edge of the tape. The tape cartridge accommodates a reel hub unit rotatably, for winding a tape on its periphery, and includes a leader member for holding and fixing a leading edge of the tape. The leader member has a pin member having a pair of collar portions between which the tape-shaped recording medium is positioned, and a clamp member fitted in between the collar portions from through a longitudinal opening formed in a cylindrical body, and clamping the leading edge of the recording medium between the pin member and the clamp member. A diameter of the pin member is about 1.2 to 1.8 mm, and an inside diameter of the clamp member is about 90 to 96.6% of the diameter.

2 Claims, 8 Drawing Sheets

FIG. 5A
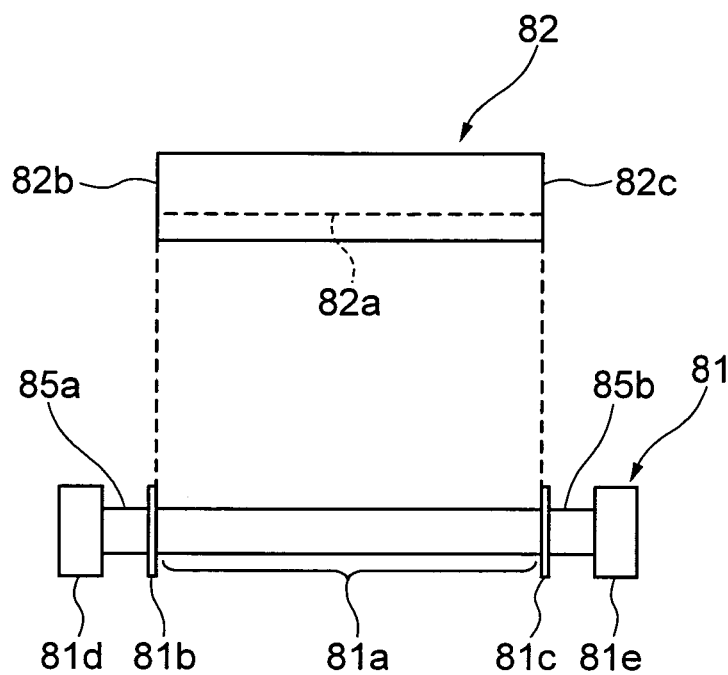
FIG. 5B
FIG. 5C
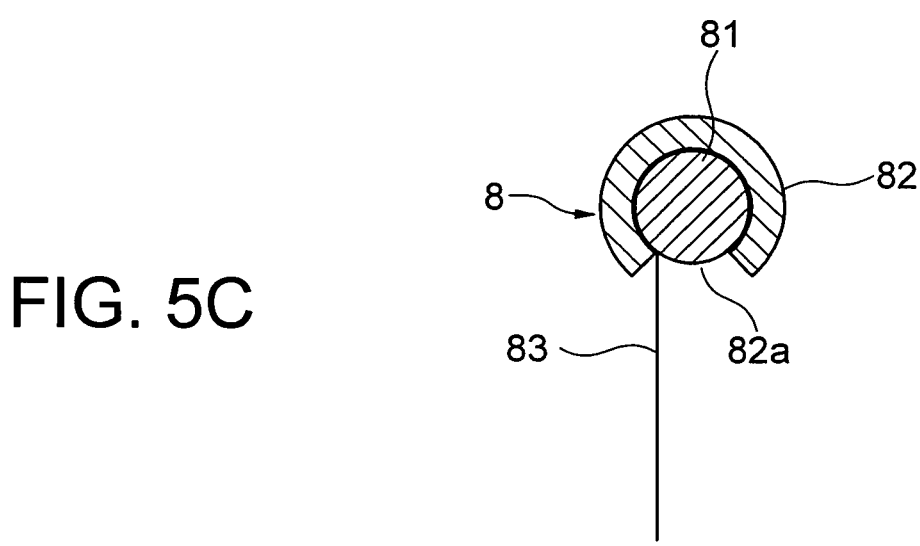

TAPE CARTRIDGE

INCORPORATION BY REFERENCE

The present application claims priority under 35 U.S.C. §119 to Japanese Patent Application No. 2003-086945 filed on Mar. 27, 2003. The content of the application is incorporated herein by reference in its entirety.

BACKGROUND OF THE INVENTION

1. Field of the Invention

The present invention relates to a tape cartridge including a leader member to which a leading edge of a tape-shaped recording medium led outside is attached.

2. Description of the Related Art

A 1-reel type tape cartridge accommodates a single reel hub unit constructed of an upper flange and a lower flange. A tape-shaped recording medium is wound along a periphery of the hub unit. The thus constructed tape cartridge is used for storing backup data for a computer, and so forth. When this type of tape cartridge is loaded into a magnetic recording/reproducing apparatus, the tape-shaped recording medium wound along the periphery of the hub of the reel hub unit provided inside is led out and wound on a reel hub unit on the side of a magnetic recording/reproducing apparatus. The tape-shaped recording medium runs between the two reel hub units, whereby recording and reproducing are conducted.

FIG. 10 shows a leader member to which the leading edge of the tape-shaped recording medium led out of the tape cartridge described above is attached. As illustrated in FIG. 10, a leader member 100 is constructed of a pin member 101 and a clamp member 102. The leading edge of a tape-shaped recording medium 110 is held along a periphery of the pin member 101 as the leading edge is clamped by the clamp member 102. When the tape cartridge is loaded into a recording/reproducing apparatus, engagement portions 102 of the leader member 100 engage with a tape lead-out mechanism on the apparatus side (refer to Japanese Patent Application Laid-Open Publication No.11-185435).

When assembling the leader member 100 as shown in FIG. 10, the tape-shaped recording medium 110 is positioned between the pin member 101 and the clamp member 102 and is pinched by intruding the clamp member 102 on an outer peripheral surface of the pin member 101 between collar portions 103 from through an opening 102a. In the thus assembled leader member 100, when the tape cartridge is employed in the recording/reproducing apparatus, the engagement portions 102 provided at both edges of the pin member 101 are engaged with the apparatus side and thus pulled, and hence the leader member 100 is required to have a clamping force acting on the tape-shaped recording medium 110. If the clamping force insufficient, the leading edge of the tape-shaped recording medium 110 gets mis-aligned with the leader member 100 and further might come off.

SUMMARY OF THE INVENTION

It is an object of the present invention to provide a tape cartridge enabling a leader member fixing a leading edge of a tape-shaped recording medium led outside to acquire sufficient clamping force acting on the leading edge of the tape-shaped recording medium.

The present invention was devised by the present inventors who accomplish the above object on the basis of knowledge acquired by the prevent inventors as a result of assiduous study, wherein if a leader member is constructed of a pin member and a clamp member, when the clamp member is fitted into the pin member from through an opening and clamps a leading edge of a tape-shaped recording medium, clamping force of the leader member is closely related to a dimensional relationship between a diameter of the pin member and an inside diameter of the clamp member and further to a dimensional relationship between the diameter of the pin member and a width of an entrance of the opening.

Namely, a tape cartridge in an embodiment accommodates a reel hub unit rotatably, for winding a tape-shaped recording medium on its periphery, and includes a leader member for holding and fixing a leading edge of the tape-shaped recording medium. The leader member has a pin member having a pair of collar portions between which the tape-shaped recording medium is positioned, and a clamp member fitted in between the collar portions from through an opening so formed in a longitudinal direction of a cylindrical body as to extend to end surfaces on both sides of said cylindrical body, and clamping the leading edge of the tape-shaped recording medium between the pin member and the clamp member itself. A diameter d of the pin member falls within a range of 1.2 to 1.8 mm, and an inside diameter of the clamp member falls within a range of 90 to 96.6% of the diameter d.

According to the present tape cartridge, in the leader member, the inside diameter of the clamp member falls within the predetermined range of the diameter of the pin member, whereby the leader member can acquires the sufficient clamping force acting on the leading edge of the tape-shaped recording medium. Therefore, during the use, the leading edge of the tape-shaped recording medium led out by the leader member from the tape cartridge can be prevented from being mis-aligned with the leader member and from coming off.

In the tape cartridge described above, it is preferable that a width of an entrance of the opening of the clamp member falls with a range of 73 to 87% of the diameter of d. This contrivance enables the leader member to acquire the sufficient clamping force acting on the leading edge of the tape-shaped recording medium. Moreover, the clamp member is formed of preferably PC (polycarbonate) and may also be formed of POM (polyoxymethylene) or PA (polyamide). The clamp member is manufactured as injection-molded of these resinous. These resinous materials may be mixed with glass fibers.

BRIEF DESCRIPTION OF THE DRAWINGS

FIG. 5A is a side view of a clamp member in FIG. 1;

FIG. 5B is a side view of a pin member;

FIG. 5C is a cross-sectional view showing a leader member in which a magnetic recording tape is caught by the pin member and the clamp member is fitted thereon;

DETAILED DESCRIPTION OF THE PREFERRED EMBODIMENTS

Figure 1:
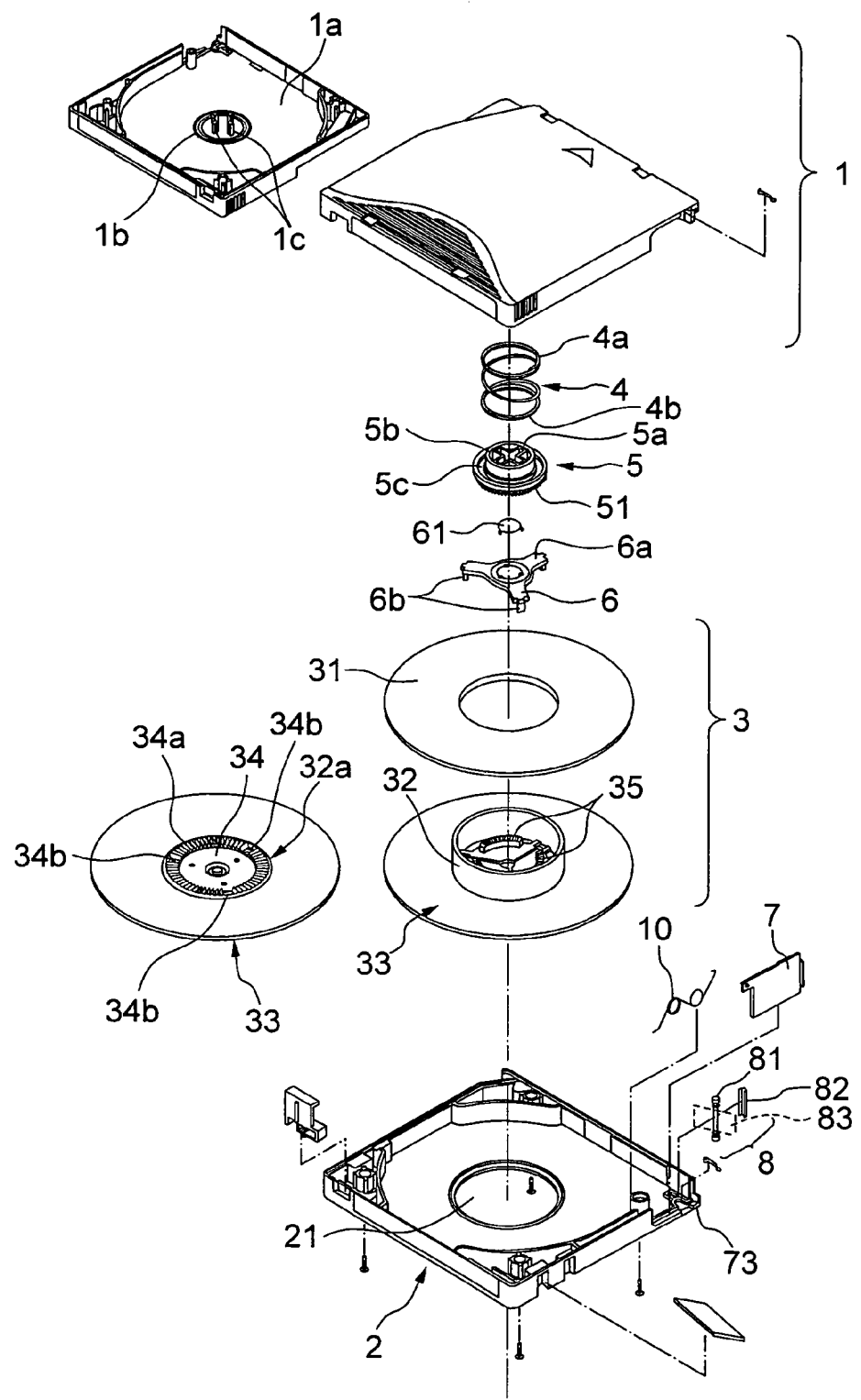
FIG. 1 is an exploded perspective view of a tape cartridge in an embodiment.
Figure 2:
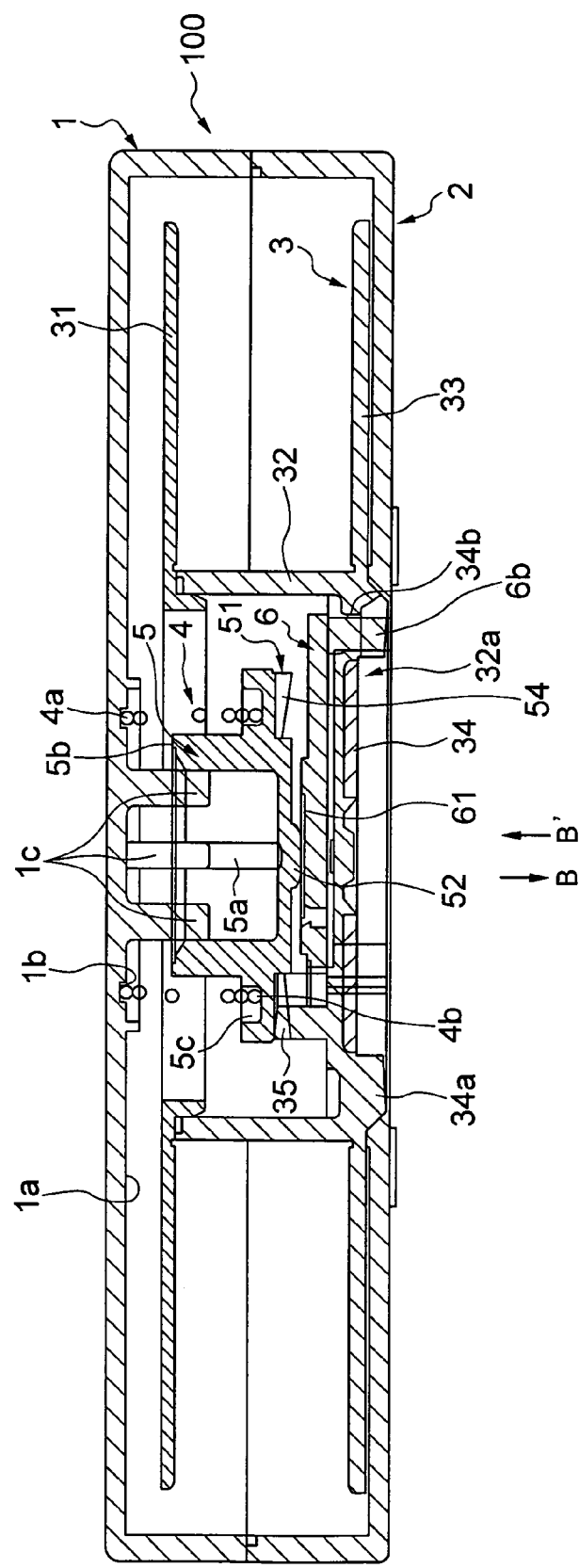
FIG. 2 is a vertical sectional view of the tape cartridge in FIG. 1, showing a state where a reel hub unit is locked in a lock position.
Figure 3:
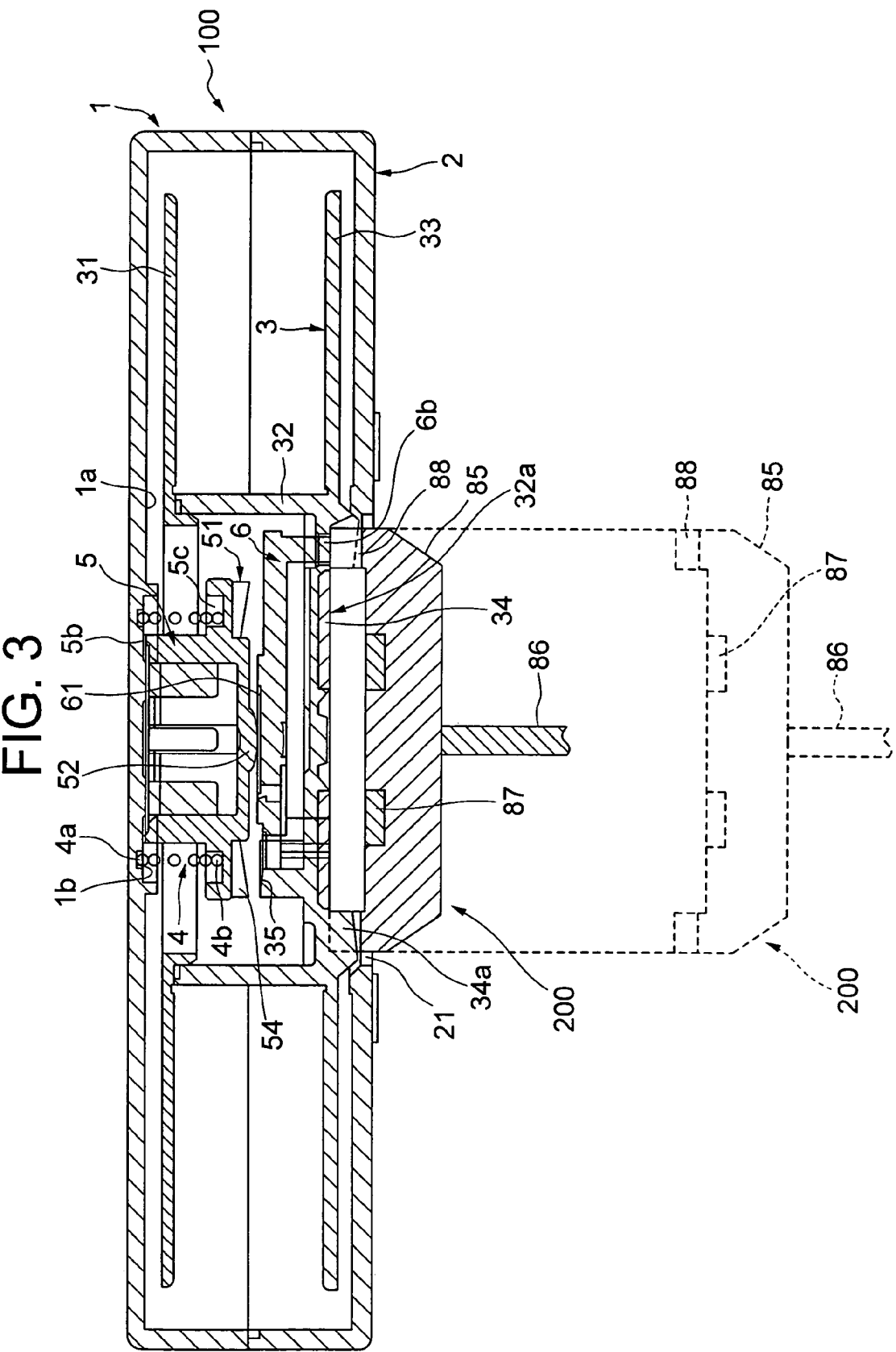
FIG. 3 is a vertical sectional view of the tape cartridge in FIG. 1, showing a state where the reel hub unit is unlocked in an unlock position.

Embodiments of the present invention will hereinafter be described with reference to the accompanying drawings. FIG. 1 is an exploded perspective view of a tape cartridge according to the embodiment of the present invention. FIG. 2 is a vertical sectional view showing a state where a reel hub unit is locked in the tape cartridge in FIG. 1. FIG. 3 is similarly a vertical sectional view showing a state the reel hub unit is unlocked. Note that FIG. 1 also shows a perspective view of an upper case 1 and a hub 32 as viewed from undersurfaces thereof.

A tape cartridge 100 illustrated in FIG. 1 is constructed of the upper case 1 and a lower case 2 in the form of a 1-reel type taking a rectangular flat shape. The tape cartridge 100 incorporates a reel hub unit wound with a magnetic recording tape defined as a tape-shaped recording medium (which might also simply be termed a "tape"), and is configured so that the reel hub unit 3 becomes rotatable when installed in a recording/reproducing apparatus. The upper case 1 and the lower case 2 can be manufactured respectively as molded of a resinous material.

The reel hub unit 3 includes, an upper flange 31, a lower flange 33 and the hub 32 formed integrally with the lower flange 33 and wound with the magnetic recording tape on its peripheral surface. Further, as illustrated in FIG. 1, a circular metal plate 34 composed of a soft magnetic body is integrally provided on the side of a lower surface 32a of the hub 32. Engagement teeth 34a engaging with teeth of a drive member 85 (FIG. 3) of the recording/reproducing apparatus are segmented into three segments in a circumferential direction along a periphery of the metal plate 34. A plurality of holes 34b are formed between the respective engagement teeth 34a, extending in penetration to an opposite surface of the lower surface 32a. The metal plate 34, the engagement teeth 34a and the plurality of holes 34b are exposed to the outside via a through-hole 21 formed in the lower case 2.

Further, a tooth unit 35 including a multiplicity of teeth arranged in a circular shape so as to mesh with a tooth unit 51 of a brake lock member 5, is segmented into a plurality of segments in the circumferential direction on the surface opposite to the lower surface 32a inwardly of the hub 32. The tooth unit 35 can be manufactured as molded of a resinous material such as polycarbonate (PC). however, strength thereof may be enhanced by mixing it with a glass fiber in this case.

As shown in FIGS. 1 and 2, the brake lock member 5 is disposed inwardly of the hub 32, and includes the tooth unit 51 of which the multiplicity of teeth are arranged to mesh with the tooth unit 35 of the hub 32, a cross-shaped engagement hole 5a formed in a cylindrical end surface having a diameter smaller than that of the tooth unit 51, a peripheral edge 5b formed along a periphery of the cross-shaped hole 5a, and a ring-shaped groove 5c formed to accommodate a peripheral edge portion 4b of a brake lock spring 4 on the side of an undersurface of the tooth unit 51.

The brake lock member 5 can be manufactured as molded of a resinous material such as POM (polyoxymethylene).

The brake lock member 5 is, as shown in FIGS. 1 and 2, attached to the upper case 1 in such a way that a plurality of engagement protruded pieces 1a erected on an inner surface 1a of the upper case 1 enter the cross-shaped hole 5a and thus engage therewith so as to be movable in vertical directions in FIG. 1. The brake lock spring 4 is structured so that its front side end 4a is fitted into the ring-shaped groove 1b formed in the inner surface 1a of the upper case 1. The brake lock spring 4 is interposed between the ring-shaped groove 1b of the upper case 1 and the ring-shaped groove 5c of the brake lock member 5, and constantly biases the brake lock member 5 in a direction B in FIG. 2 with the result that the tooth unit 51 meshes with the tooth unit 35 of the hub 32, thereby generating a brake state in a way that hinders rotations of the reel hub unit 3.

A brake canceling member 6 is disposed between the hub 32 and the brake lock member 5. The brake canceling member 6 includes main plates 6a and a plurality of leg pieces 6b protruding downwards as viewed in FIG. 1 from a plurality of peripheral edges of the main plates 6a. The plurality of leg pieces 6b are inserted into a plurality of holes 34b formed in the lower surface of the hub 32. The leg pieces 6b of the brake canceling member 6 are, when the tape cartridge is loaded into the recording/reproducing apparatus, pushed from under in FIG. 1 and thus raised up. The brake lock member 5 is, as illustrated in FIG. 3, raised up at its central convex bearing portion 52 through an abutting plate 61 of the brake canceling member 6, resisting the biasing force of the brake lock spring 4, and is moved to a non-lock position so that the peripheral edge 5b gets proximal to the inner surface 1a.

Further, a leading edge 83 (depicted by a broken line in FIG. 1) of the magnetic recording tape wound on the reel hub unit 3 is fixed to a leader member 8. In the leader member 8, the leading edge 83 of the magnetic recording tape is wound on a pin member 81 and then fixed (clamped) by a clamp member 82 fitted thereon. When the tape cartridge is loaded into the recording/reproducing apparatus, the leader member 8 engages with and is thus held by a holding member on the apparatus side, whereby the tape is led on the apparatus side out of a tape lead-out port 73 (FIG. 1). The leading edge 83 of the magnetic recording tape is composed of a tape member of PET.

Moreover, the tape lead-out port 73 is opened and closed by a door member 7. The door member 7 is constantly biased by a spring member 10 in such a direction as to close the tape lead-out port 73. When loaded into the recording/reproducing apparatus, the tape lead-out port 73 is opened by an opening member (unillustrated) on the apparatus side, resisting the biasing force of the spring member 10.

In the tape cartridge shown in FIGS. 1 through 3, when not in use such as being stored and so on, the brake lock member 5 is biased by the brake lock spring 4 and is, as illustrated in FIG. 2, moved to a lock position, wherein teeth 54 of the tooth unit 51 of the brake lock member 5 mesh with teeth of the tooth unit 35 of the hub 32 of the reel hub unit 3. The reel hub unit 3 is thereby brought into the brake state and is thus unable to rotate, with the result that the unnecessary rotation is prevented and the magnetic recording tape can be prevented from slackening.

Figure 6:
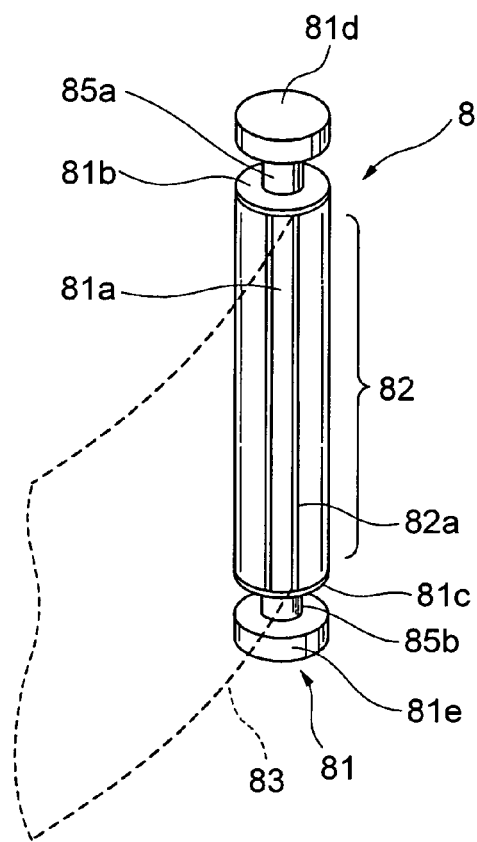
FIG. 6 is a perspective view of the leader member in FIG. 5C.
Figure 7A:
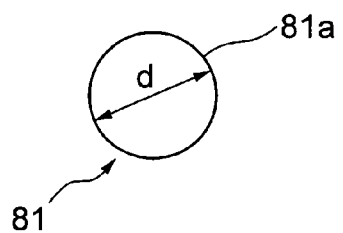
FIG. 7A is an explanatory view showing a diameter d of a core bar of the pin member in FIG. 5B.
Figure 7B:
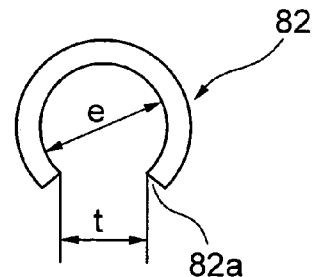
FIG. 7B is an explanatory view showing an inside diameter e of the clamp member in FIG. 5A and a width t of an entrance of an opening thereof.

The leader member will be described with reference to FIGS. 5A through 7B. FIG. 5A is a side view of the clamp member. FIG. 5B is a side view of the pin member. FIG. 5C is a cross-sectional view showing the leader member in which the leading edge of the magnetic recording tape is caught by the pin member and clamped by the clamp member fitted thereon. FIG. 6 is a perspective view of the leader member in FIG. 5C. FIG. 7A is an explanatory view showing a diameter of a core bar of the pin member in FIG. 5B. FIG. 7B is an explanatory view showing an inside diameter of the clamp member in FIG. 5A and a width of an entrance of an opening thereof.

As illustrated in FIGS. 1 and 5A through 5C, the leader member 8 is constructed of the pin member 81 formed in an elongated shape on the whole and of the clamp member 82 fitted on the pin member 81.

The pin member 81 includes, as shown in FIGS. 5A through 5C, a core bar 81a at which the leading edge of the magnetic recording tape is positioned and wound with this magnetic recording tape, collar portions 81b, 81c disposed at both edges of the core bar 81a and formed comparatively thin in thickness, disk portions 81d, 81e provided at both ends, and recessed engagement portions 85a, 85b formed respectively between the collar portions 81b, 81c and the disk portions 81d, 81e. The pin member 81 is composed of a metal material such as a stainless steel.

The clamp member 82 is, as shown in FIGS. 5A through 5C, configured of an elongated cylindrical body and includes an opening 82a formed extending from one side end surface 82b to the other side end surface 82c in a longitudinal direction. The clamp member 82 can be manufactured as injection-molded of a resinous material such as PC (polycarbonate), POM (polyoxymethylene), PA (polyamide), materials obtained by mixing these resinous materials with glass fibers.

The clamp member assumes substantially a C-shape in cross-section as shown in FIG. 5C by virtue of the opening 82a, and a length of the clamp member 82 corresponds to a length of the core bar 81a. The leading edge 83 (drawn by a broken line in FIG. 6) of the magnetic recording tape, is pinched between the collar portions 81b, 81c of the pin member 81 through an entrance (having a width t shown in FIG. 7B) from the opening 82a and fitted on the core bar 81a. The leading edge 83 of the magnetic recording tape T is thus inserted in between the outer peripheral surface of the core bar 81a and the inner peripheral surface of the clamp member 82 and is fixed by clamping.

As shown in FIGS. 7A and 7B, a configuration is that an inside diameter e of the clamp member 82 falls within a range of 90 through 96.6% of a diameter d of the core bar 81a of the pin member 81, and a width t of an entrance of the opening 82a of the clamp member 82 falls within a range of 73 through 87% of the diameter d. The width t of the entrance of the opening 82a of the clamp member 82 is a widthwise dimension of the narrowest area when inserted through the opening 82a into the core bar 81a of the pin member 81.

Herein, the diameter d of the core bar 81a of the pin member 81 is set within a range of 1.2 through 1.8 mm. For example, if the diameter d is set to 1.5 mm, the inside diameter e of the clamp member 82 is 1.35 through 1.45 mm, and the width t of the entrance of the opening 82a of the clamp member 82 is 1.095 through 1.305 mm.

As shown in FIGS. 5A and 5B, the clamp member 82 is fitted to the core bar 81a between the collar portions 81b and 81c of the pin member 81 via the entrance of the opening 82a, wherein the leading edge 83 of the magnetic recording tape is interposed therebetween, thus enabling the leader member 8 to be assembled as shown in FIG. 6.

Figure 4:
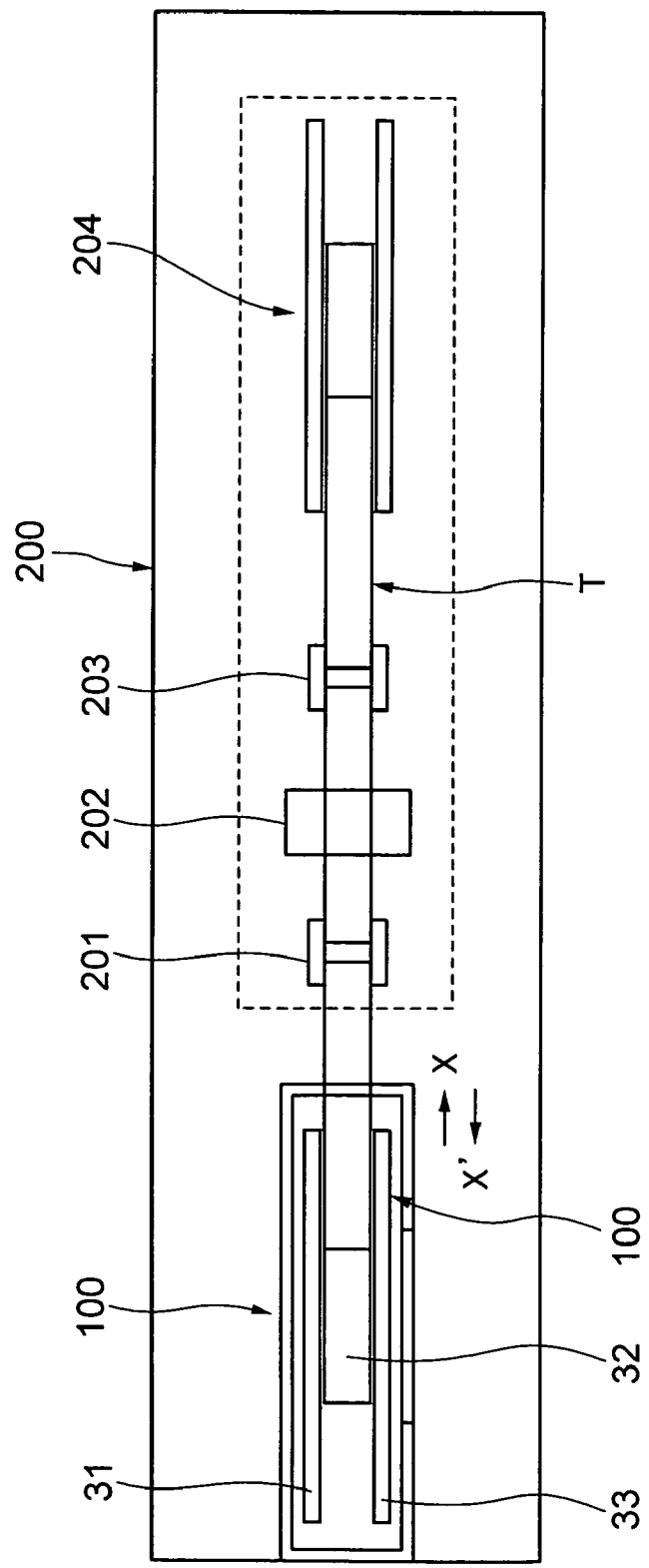
FIG. 4 is a front view conceptually illustrating a running route of the tape led out of the tape cartridge shown in FIGS. 1 through 3 towards a recording/reproducing apparatus.

Next, a case of loading the tape cartridge into the recording/reproducing apparatus will be explained referring further to FIG. 4. FIG. 4 is a front view conceptually illustrating a running route of the tape led out of the tape cartridge shown in FIGS. 1 through 3 in the recording/reproducing apparatus.

As shown in FIG. 3, the drive member 85 on the side of an apparatus 200 has a tooth unit 88 formed on its outer periphery. The tooth unit 88 engages with the engagement teeth 34a of the hub 32. The drive member 85 has ring-shaped magnets 87 embedded therein on the side of an inner periphery of the tooth unit 88.

As illustrated in FIG. 4, when the tape cartridge 100 is loaded into the recording/reproducing apparatus 200, the drive member on the side of the apparatus 200 and the tape cartridge 100 get relatively approached. Then, the drive member 85 passes through the through-hole 21 of the lower case 2. The magnets 87 of the drive member 85 approach and magnetically attract the metal plate 34 composed of the soft magnetic body on the side of the lower surface 32a of the hub 32, and the tooth unit 88 of the drive member 85 engages with the engagement teeth 34a of the hub 32. Then, the brake canceling member 6 moves in a direction B' (opposite to the direction B) in FIG. 2 by use of its leg portions 6b with the protrusions of the tooth unit 88 of the drive member 85, whereby the brake lock member 5 moves by a fixed stroke while resisting the biasing force of the brake lock spring 4 and reaches the non-lock position as shown in FIG. 3. Then, the tooth unit 51 and the tooth unit 35 come to have a gap therebetween and thus disengage from each other. As a result, rotations of a drive shaft 86 of the drive member 85 enable the reel hub unit 3 to rotate.

Next, the door member 7 is opened by an opening member (unillustrated) on the side of the recording/reproducing apparatus 200, and the leader member 8 is, through the engagement portions 85a, 85b in FIG. 6, engaged with and thus held by the holding member (not shown) on the side of the apparatus 200, whereby the magnetic recording tape T is, with its leading edge 83 headed, led out on the side of the apparatus 200 (FIGS. 1 and 6) and wound along the periphery of the hub of the reel hub unit 204. Then, the reel hub unit 3 of the tape cartridge 100 and the reel hub unit 204 of the recording/reproducing apparatus 200 are rotationally driven. Consequently, as shown in FIG. 4, the magnetic recording tape T is guided by guides 201, 203 on both sides of a recording/reproducing head 202 in a horizontal direction X or a horizontal direction X' opposite to X. The magnetic recording tape T is, during its running, subjected to recording or reproducing by the recording/reproducing head 202.

As discussed above, according to the tape cartridge 100 in the present embodiment, in the leader member 8, the inside diameter e of the clamp member 82 and the width t of the entrance of the opening 82a are respectively set within the predetermined ranges of the diameter d of the pin member 81, whereby the leader member 8 acquires the sufficient clamping force acting on the leading edge 83 of the magnetic recording tape T. Therefore, when the tape cartridge 100 is employed as illustrated in FIG. 4, the leading edge 83 of the magnetic recording tape T led out by the leader member 8 from the tape cartridge 100 and running in the horizontal direction X or X', can be prevented from being mis-aligned with the leader member and coming off.

Next, the present invention will be described more specifically by way of examples.

Figure 8:
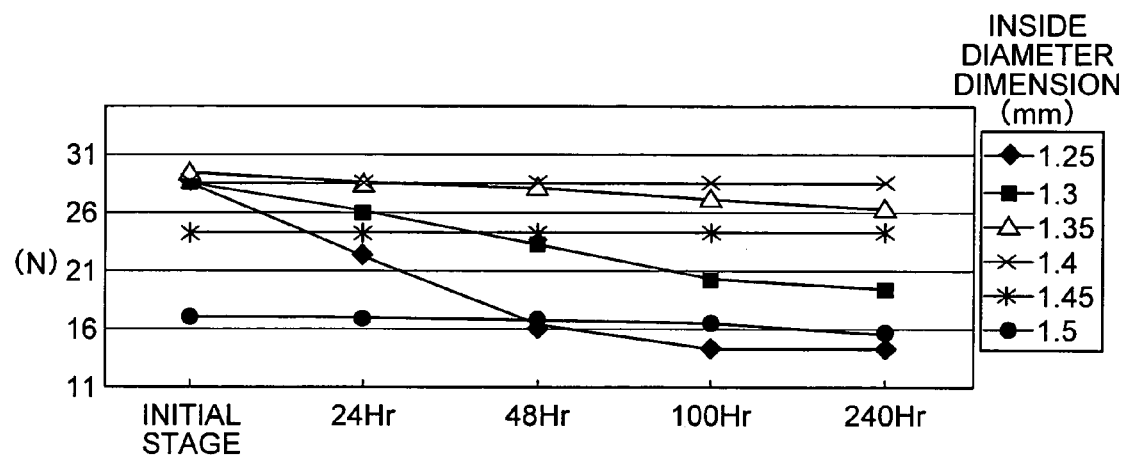
FIG. 8 is a chart showing changes in clamping force depending on a retaining time in examples 1 through 3 and comparative examples 1 through 3.

By way of examples, the leader member in FIGS. 5A through 7B is manufactured in a way that changes the inside diameter e (FIG. 7B) of the clamp member as shown in the following Table 1, wherein changes in the clamping force of the leader member are measured under conditions that follow. Namely, immediately after (at an initial stage of) assembling the leader member, and after storing the leader member at a predetermined storage temperature for fixed periods of time (24 hours, 48 hours, 100 hours and 240 hours), the clamping force is measured by performing a tensile test. Further, by way of comparative examples 1 through 3, the same test is conducted in a way that changes the inside diameter e of the clamp member. Table 1 and FIG. 8 show results of the examples 1 through 3 and results of the comparative examples 1 through 3. Note that the clamp retaining force requires 16N or larger according to the standards. Further, a length of the clamp member is 12.6 mm. The clamp member is manufactured by use of PC (made by Teijin Chemical Co., Ltd.) Storage Temperature: 80° C. Diameter d of Core Bar of Pin Member (FIG. 7A): 1.5 mm Width t of Entrance of Opening of Clamp Member (FIG. 7(b)): 1.22 mm Lead Tape of Leading Edge of Magnetic Recording Tape: Made of PET (17 μm in thickness)

TABLE 1

Changes in the clamping force (N) depending on differences in dimension of the inside diameter (e) Entrance widthwise dimension: 1.22 mm

|  | Dimension | Initial Stage | 24 Hr | 48 Hr | 100 Hr | 240 Hr |
|---|---|---|---|---|---|---|
| Comparative Example 1 | 1.25 | 28.8 | 22.0 | 16.0 | 14 | 14 |
| Comparative Example 2 | 1.3 | 28.5 | 25.9 | 23.0 | 20 | 19 |
| Example 1 | 1.35 | 29.4 | 28.2 | 28.0 | 27 | 26.2 |
| Example 2 | 1.4 | 28.5 | 28.2 | 28.1 | 28.2 | 28.2 |
| Example 3 | 1.45 | 24.2 | 24.0 | 24.0 | 24.0 | 24.0 |
| Comparative Example 3 | 1.5 | 17.0 | 16.8 | 16.5 | 16.3 | 15.5 |

As can be understood from Table 1 and FIG. 8, the diameter d of the core bar of the pin member is set to 1.5 mm, and the width t of the entrance of the opening of the clamp member is set to 1.22 mm. In this case, according to the examples 1–3 wherein the inside diameter e of the clamp member is changed to 1.35 mm, 1.4 mm and 1.45 mm, the clamping force sufficiently meets the standards (16N) and has almost no decline after an elapse of the storage period. By contrast, according to the comparative examples 1 and 2 wherein the inside diameter e of the clamp member is less than 1.35 mm, the clamping force remains preferable during a comparatively short storage period, but considerably declines during a comparatively long storage period. In the comparative example 1, the clamping force does not meet the standards. Further, in the comparative example 3 wherein the inside diameter e of the clamp member exceeds 1.45 mm, clamping force remains relatively low from the initial stage but does not gain strength. When the storage period extends long, the clamping force becomes small enough not to meet the standards.

Figure 9:
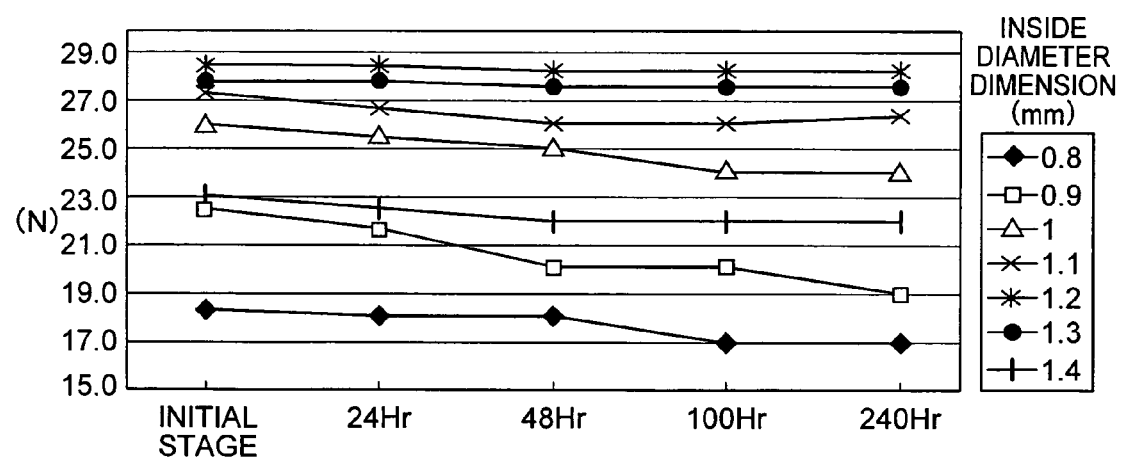
FIG. 9 is a chart showing the changes in the clamping force depending on the retaining time in examples 4 through 6 and comparative examples 4 through 7.
Figure 10:
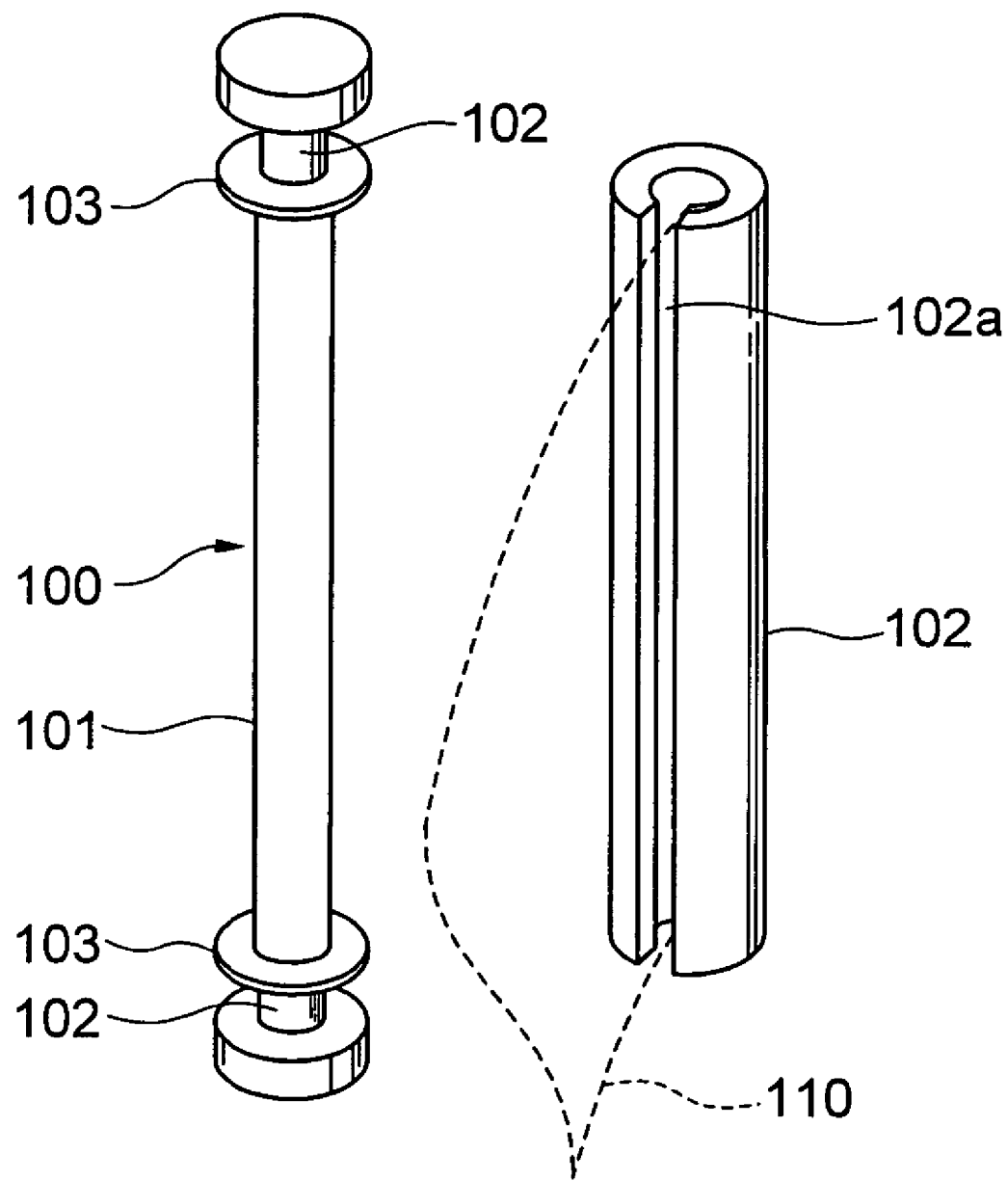
FIG. 10 is a perspective view showing a pin member and a clamp member of a leader member in the prior art.

By way of examples 4 through 6, the leader member in FIGS. 5 through 8 is manufactured in a way that fixes the inside diameter e of the clamp member to 1.41 mm and changes the width t (FIG. 7B) of the entrance of the opening of the clamp member as shown in the following Table 2, wherein changes in the clamping force of the leader member are measured under the same conditions as in the examples 1–3. Further, by way of comparative examples 4 through 7, the same test is conducted in a way that changes the width t of the entrance of the opening of the clamp member. Table 2 and FIG. 9 show results of the examples 4 through 6 and results of the comparative examples 4 through 7.

TABLE 2

Changes in the clamping force (N) depending on differences in dimension of the width t Inside diameter dimension: Φ1.41 mm

|  | Dimension | Initial Stage | 24 Hr | 48 Hr | 100 Hr | 240 Hr |
|---|---|---|---|---|---|---|
| Comparative Example 4 | 0.8 | 18.3 | 18.0 | 18.0 | 17.0 | 17.0 |
| Comparative Example 5 | 0.9 | 22.5 | 21.6 | 20.0 | 20.0 | 19.0 |
| Comparative Example 6 | 1 | 26.0 | 25.5 | 25.0 | 24.0 | 24.0 |
| Example 4 | 1.1 | 27.3 | 26.7 | 26.0 | 26.0 | 26.2 |
| Example 5 | 1.2 | 28.5 | 28.4 | 28.2 | 28.2 | 28.2 |
| Example 6 | 1.3 | 27.8 | 27.8 | 27.6 | 27.5 | 27.5 |
| Comparative Example 7 | 1.4 | 23.0 | 22.5 | 22.0 | 22.0 | 22.0 |

As can be understood from Table 2 and FIG. 9, the diameter d of the core bar of the pin member is set to 1.5 mm, and the inside diameter e of the clamp member is set to 1.41 mm. In this case, according to the examples 4–6 wherein the width t of the entrance of the opening of the clamp member is changed to 1.1 mm, 1.2 mm and 1.3 mm, the clamping force sufficiently meets the standards (16N) and has almost no decline after the elapse of the storage period. By contrast, according to the comparative examples 4, 5 and 6 wherein the inside diameter e of the clamp member is less than 1.1 mm, and in the comparative example 7 wherein the inside diameter e exceeds 1.3 mm, the clamping force is relatively low from the initial stage and decreases as the storage period extends long.

The present invention has been discussed so far by way of the embodiments and the examples but is not limited to those embodiments and examples. The present invention can be modified in a variety of forms within the scope of the technical concept of the present invention. For instance, the diameter of the pin member is not restricted to 1.5 mm and can be selected from a range of 1.2 through 1.8 mm.

According to the tape cartridge in the present embodiment, the leader member for fixing the leading edge of the tape-shaped recording medium led outside by use of the pin member and the clamp member, is capable of acquiring the sufficient clamping force acting on the leading edge of the tape-shaped recording medium.

What is claimed is:

1. A tape cartridge comprising:
   a reel hub unit, for winding a tape-shaped recording medium on its periphery, rotatably accommodated in said tape cartridge; and
   a leader member for holding and fixing a leading edge of the tape-shaped recording medium,
   wherein said leader member includes a pin member having a pair of collar portions between which a leading edge of the tape-shaped recording medium is positioned, and a clamp member fitted in between said collar portions through an opening so formed in a longitudinal direction of a cylindrical body as to extend to end surfaces on both sides of said cylindrical body, and clamping the leading edge of the tape-shaped recording medium between said pin member and said clamp member itself,
   a diameter of the pin member falls within a range of 1.2 to 1.8 mm, and
   an inside diameter of said clamp member falls within a range of 90 to 96.6% of the diameter of the pin member.

2. A tape cartridge according to claim 1, wherein a width of an entrance of the opening of said clamp member falls with a range of 73 to 87% of the diameter of the pin member.

* * * * *